United States Patent
Grund

(10) Patent No.: US 6,443,292 B1
(45) Date of Patent: Sep. 3, 2002

(54) ARRAY FOR INDIVIDUALIZING CONTIGUOUS PACKAGES

(75) Inventor: Hans-Joachim Grund, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/762,822

(22) PCT Filed: Aug. 3, 1999

(86) PCT No.: PCT/DE99/02376

§ 371 (c)(1),
(2), (4) Date: Apr. 3, 2001

(87) PCT Pub. No.: WO00/09428

PCT Pub. Date: Feb. 24, 2000

(30) Foreign Application Priority Data

Aug. 13, 1998 (DE) .......................... 198 36 764

(51) Int. Cl.⁷ ................................. B65G 43/00
(52) U.S. Cl. .................. 198/444; 198/460.1; 198/463.6
(58) Field of Search .............. 198/444, 459.6, 198/459.7, 460.1, 463.4, 463.6, 809

(56) References Cited

U.S. PATENT DOCUMENTS

| 3,930,573 A | * | 1/1976 | Wyman | 198/460.1 |
| 4,120,393 A | | 10/1978 | Motooka et al. | |
| 4,634,328 A | * | 1/1987 | Carrell | 198/444 |
| 4,765,452 A | * | 8/1988 | Johansson | 198/463.6 |
| 4,925,005 A | | 5/1990 | Keller | |
| 5,437,360 A | * | 8/1995 | Eberhard | 198/809 |
| 5,638,938 A | | 6/1997 | Lazzarotti et al. | |

FOREIGN PATENT DOCUMENTS

EP 0 780 328 6/1997

* cited by examiner

Primary Examiner—Joseph E. Valenza
(74) Attorney, Agent, or Firm—Venable; Robert Kinberg

(57) ABSTRACT

The invention relates to an array for individualizing articles from a group of articles. The array has several rows of lifting mechanisms (2) arranged one after the other in the direction of conveyance, narrow endless conveyor belts (1) disposed between the lifting mechanisms. Detecting means (5) for detecting when the group reaches the end of the array. Detecting means (3,4) for detecting the position and contours of the articles in the group. A control (6) receives signals from the three detecting means to control the operation of the belts and lifting mechanisms to individualize the articles.

11 Claims, 7 Drawing Sheets

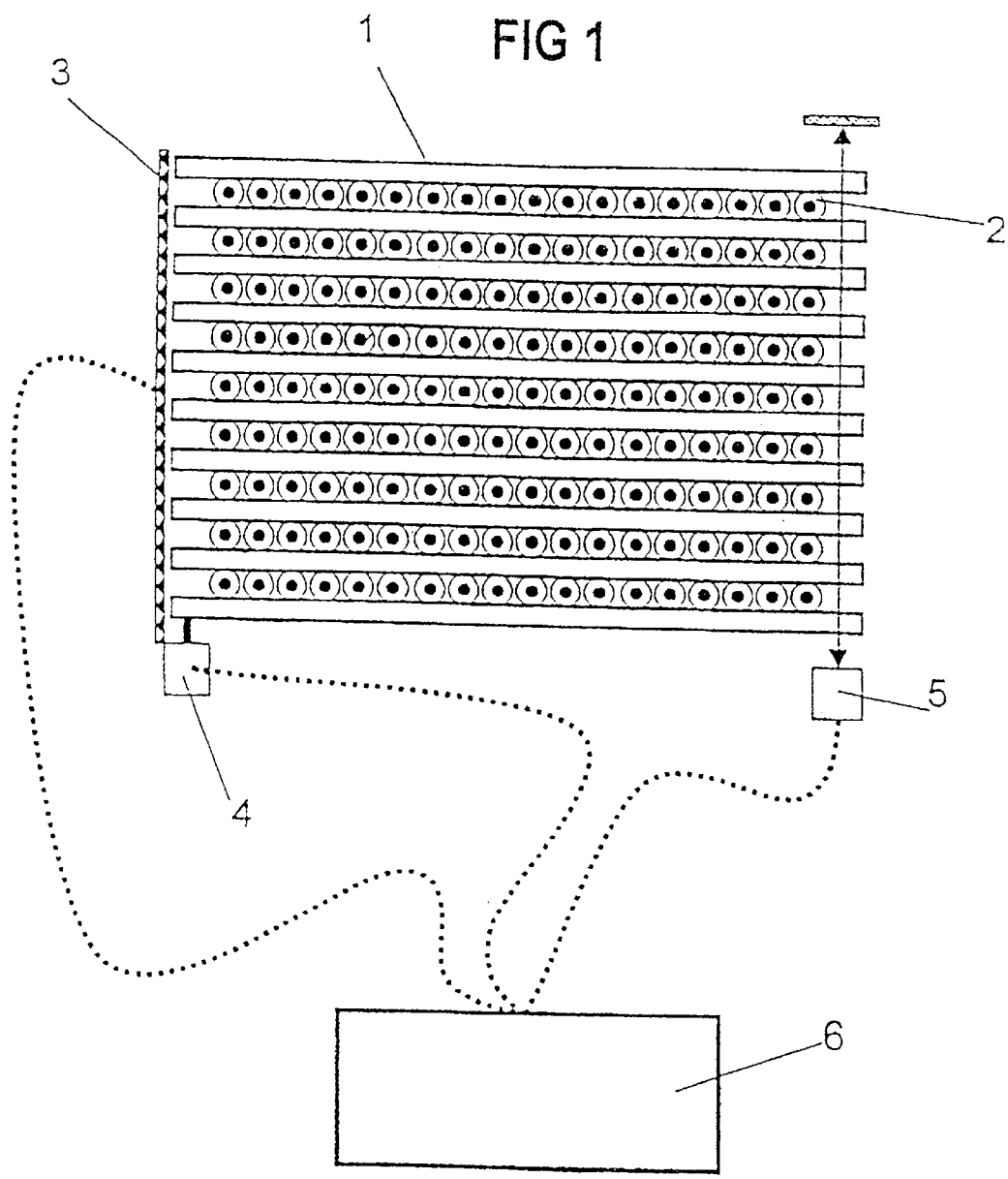

Figure 2A:
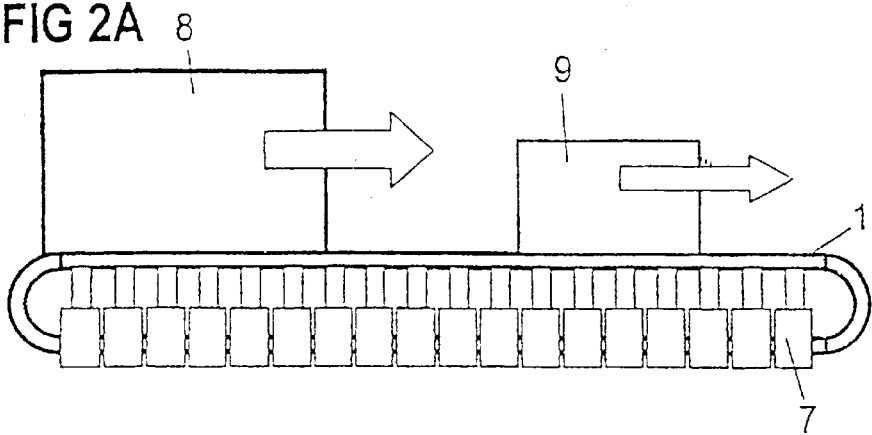

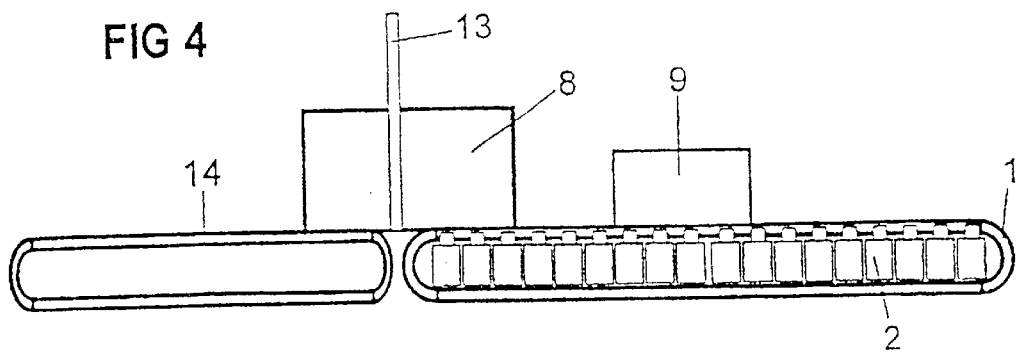
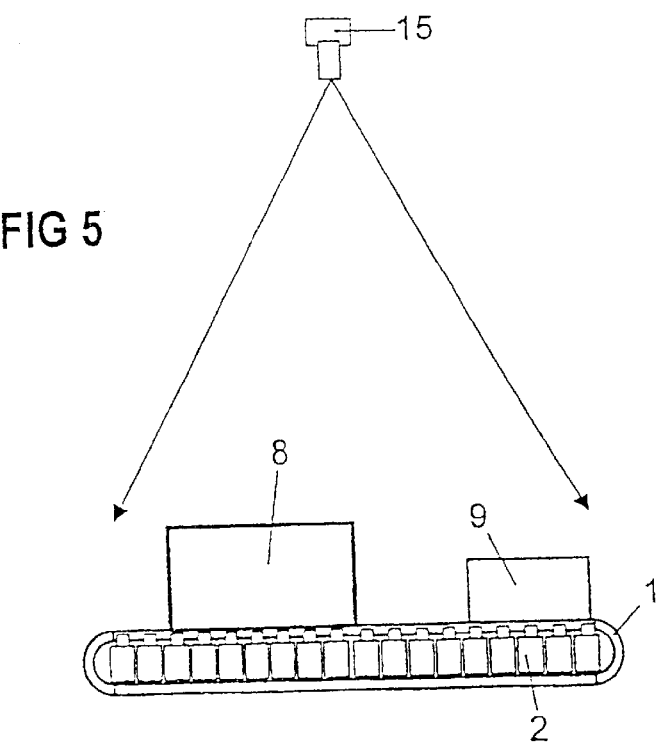

ARRAY FOR INDIVIDUALIZING CONTIGUOUS PACKAGES

The invention relates to an arrangement for separating adjacent packages that are conveyed in and out of the arrangement by transport elements. The packages are conveyed into the separating arrangement in a random, adjacent arrangement; a preprocessing system ensures that no packages lie on top of others. The term packages also encompasses parcels, newspaper bundles and sack-type mail items. After the separating process, the packages are conveyed consecutively to a further processing system. This can be the input part of a sorting system in which the packages are sorted according to various criteria (e.g., recipient address, color or size).

EP 780 328 A1 discloses a corresponding separating device having consecutive sections with driven rollers that are oriented at a diagonal with respect to a guide wall. The roller speeds increase from section to section in order to create spaces between the packages. The transport path for the packages thereby becomes narrower from section to section, so only individual packages leave the device. The packages that are separated out via the open sides in the sections travel back to the transport path with the sections by way of a return path. This solution requires a large amount of space, particularly with respect to length, and does not assure reliable separation of packages of different sizes, because two narrow packages can pass through the separator side by side.

U.S. Pat. No. 5,638,938 describes a further separating device for packages, in which a plurality of separately-driven, ascending transport belts are disposed one behind the other, with the packages falling from the upper part of the preceding belt onto the lower part of the next belt. Light barriers are disposed between the belts. If packages are located within a light barrier, the drive of the respective preceding belt is shut off. This pulls apart the bunch of packages in the transport direction. Because it is also possible, however, for packages to be adjacent to one another, fingers are provided for only allowing the passage of one package out of a plurality of adjacent packages. The fingers are controlled by the signals of an optical sensor line disposed transversely to the transport direction. This solution also requires a considerable structural length, and also does not assure reliable functioning with packages that vary widely in size (particularly with the use of the fingers).

It is therefore the object of the invention to create the most compact possible arrangement for separating adjacent packages, whose function is not affected by the size of the packages.

Because of the array-type arrangement of lifting mechanisms, between which transport belts are located, and the purposeful actuation of the lifting mechanisms and the drive within the described time frames on the basis of the detected packages, the design can be very compact, and packages of varying sizes can be separated reliably, with the intervals of the lifting mechanisms being selected to ensure that packages of a fixed minimum size are reliably separated.

In one embodiment, lifting magnets were selected as an advantageous embodiment for the lifting mechanisms. When the packages are conveyed in, the tappets of the lifting magnets are located in the upper end position, and after the incoming phase has ended, an adjusting mechanism raises all of the lifting magnets, or lowers the transport belts such that the tappets are located above the transport plane of the transport belts. When the first package is separated out, all of the tappets on which no packages are located are additionally lowered, and after the separation process, the adjusting mechanism lowers the lifting magnets again, or the transport belts are raised again and all of the tappets of the lifting magnets are moved back into the upper end position. The raising and lowering of all of the lifting magnets, or the lowering and lifting of the transport belts by an adjusting mechanism, allows the tappets of the lifting magnets to be moved into the upper end position without a load. Because only a small retaining current is necessary for holding the tappets in the upper position, even with a load, the current requirement for the lifting magnets can be kept low. Pneumatic or hydraulic lifting cylinders can be used as an advantageous embodiment of the lifting mechanisms. When the packages are conveyed in, the tappets of the lifting cylinders are located in the lower end position, and after the incoming phase has ended, the tappets of the lifting cylinders above which packages are located are moved into the upper end position above the transport plane of the transport belts. This advantageous embodiment does not require a central adjustment of the lifting cylinders or transport belts, because their tappets can also be moved upward under a load.

It is advantageous to damp the downward movement of the tappets, so the contact with the packages is not lost during the downward movement of the tappets, and the packages are extensively prevented from sliding. With the lifting magnets, this damping can be attained by means of induction or an eddy current, and with the lifting cylinders, by way of additional valves. Measuring elements, which additionally record the height profile, are advantageously also provided for reliably identifying packages that are touching. These measurements can be performed with, for example, laser trio regulation.

In a further advantageous embodiment, a color-recording device, which is used in conjunction with or in place of the measuring elements that record the occupied surfaces, is provided for better identification of packages that are touching.

In the advantageous embodiment, an optical sensor line is provided transversely to the transport direction, and beneath the transport plane, for determining the base shapes of the packages in front of the transport belts and lifting mechanisms. Because the packages are transported past the sensor line, an interval-setting device is used for easily determining the occupied surfaces for the traversed path and the control device.

The occupied surfaces/base shapes can also be ascertained simply and reliably if the lifting mechanisms are equipped with sensors that detect the tappet load as of a minimum weight.

When it is necessary to orient the packages, it is also advantageous to lower the tappets that are beneath a fixed point of rotation later than the other tappets under the respective package, so the transport belts rotate the packages about this point during this time.

Figure 2B:
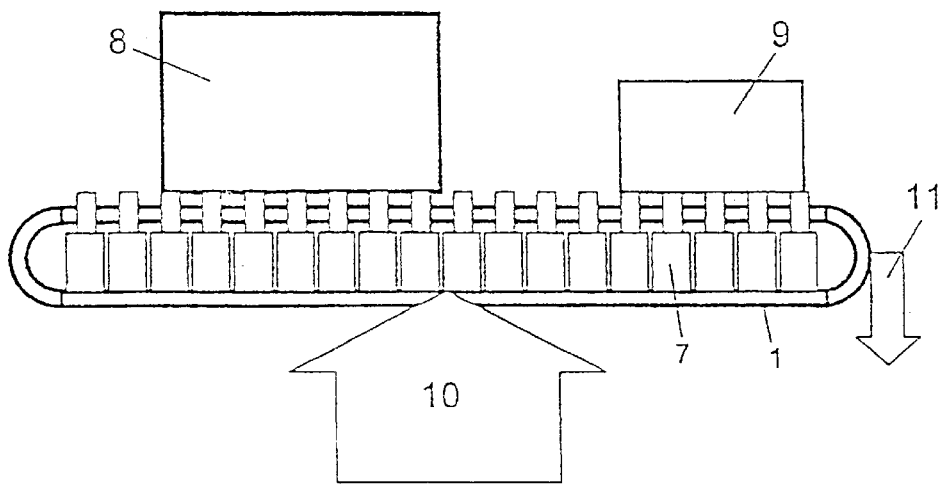
Figure 2C:
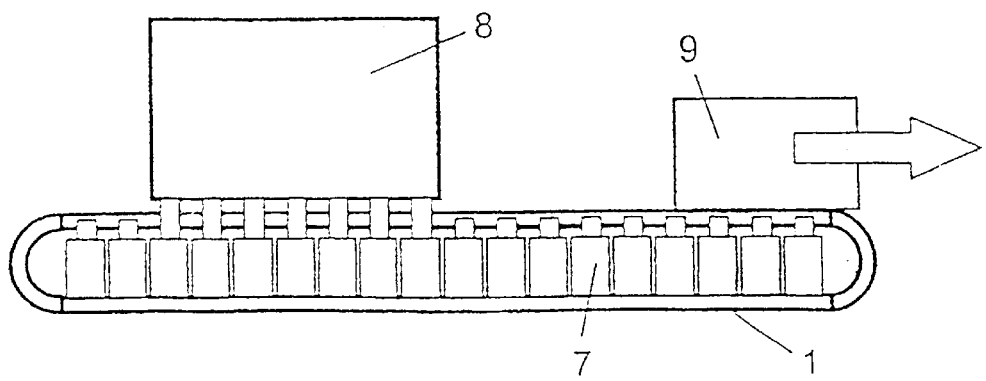
Figure 3A:
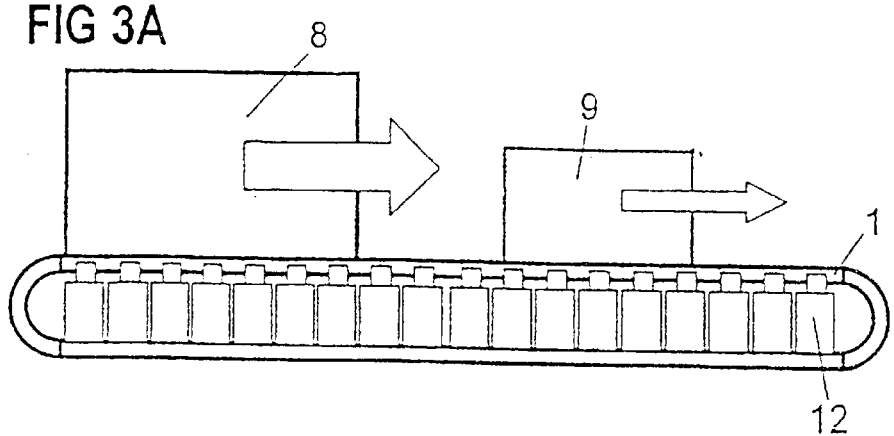
Figure 3B:
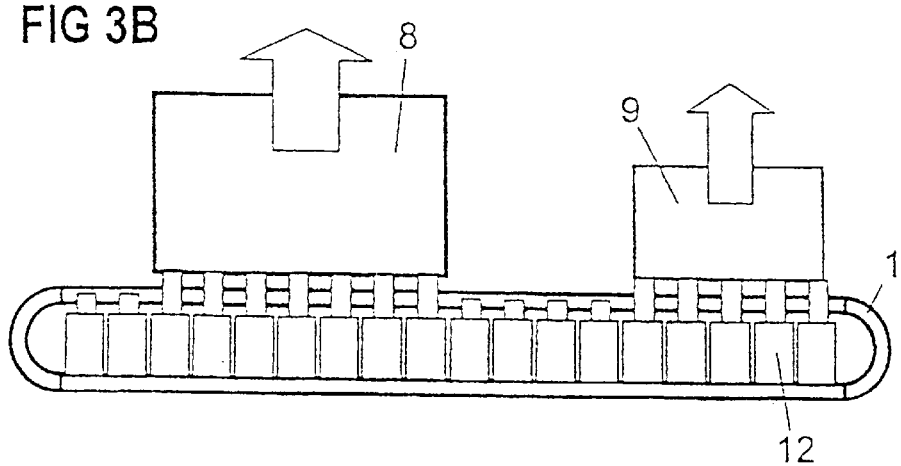
Figure 3C:
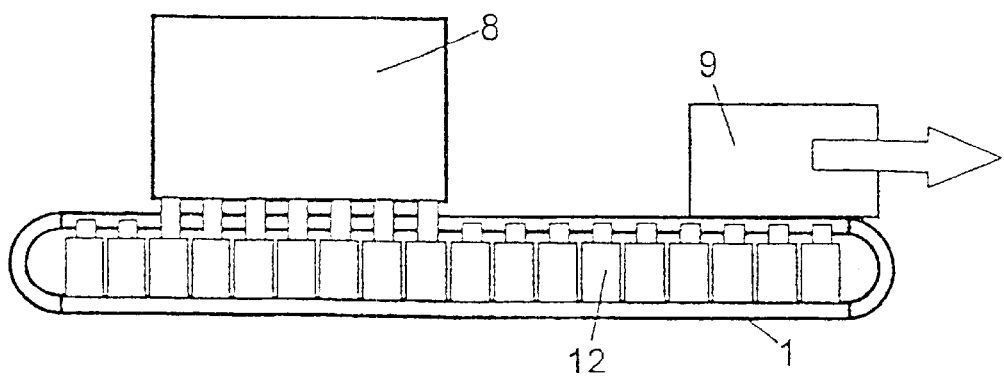
Figure 6A:
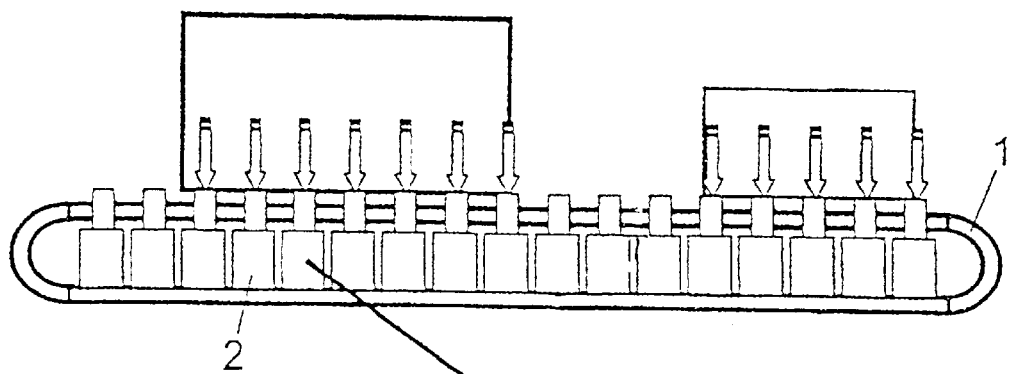
Figure 7:
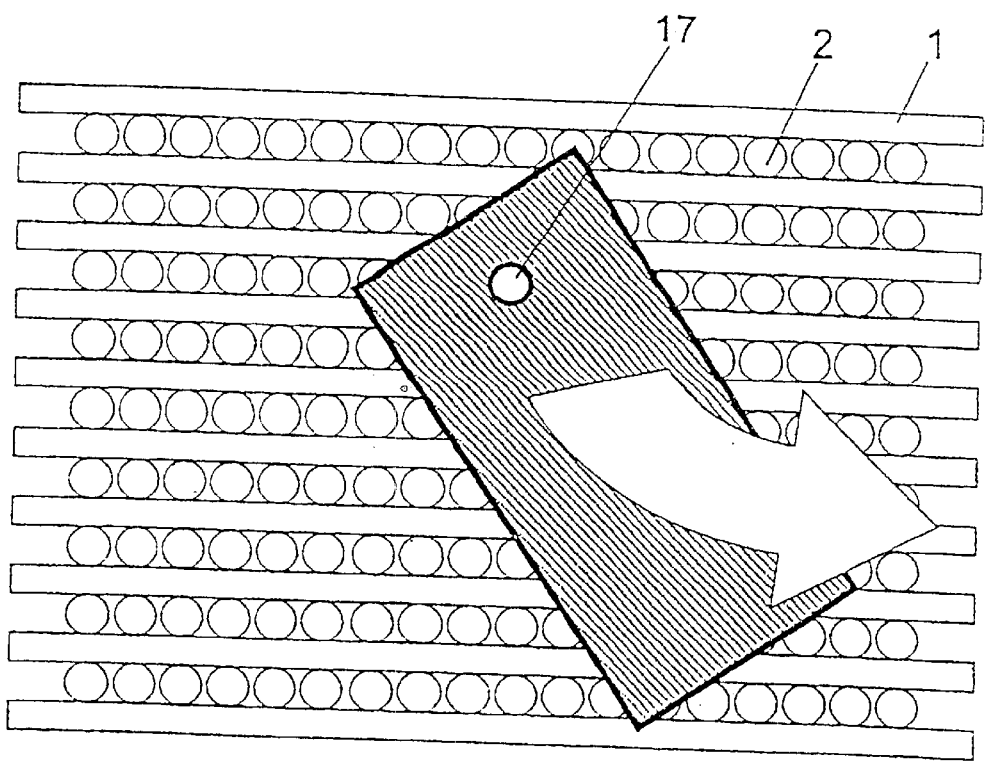
Figure 8:
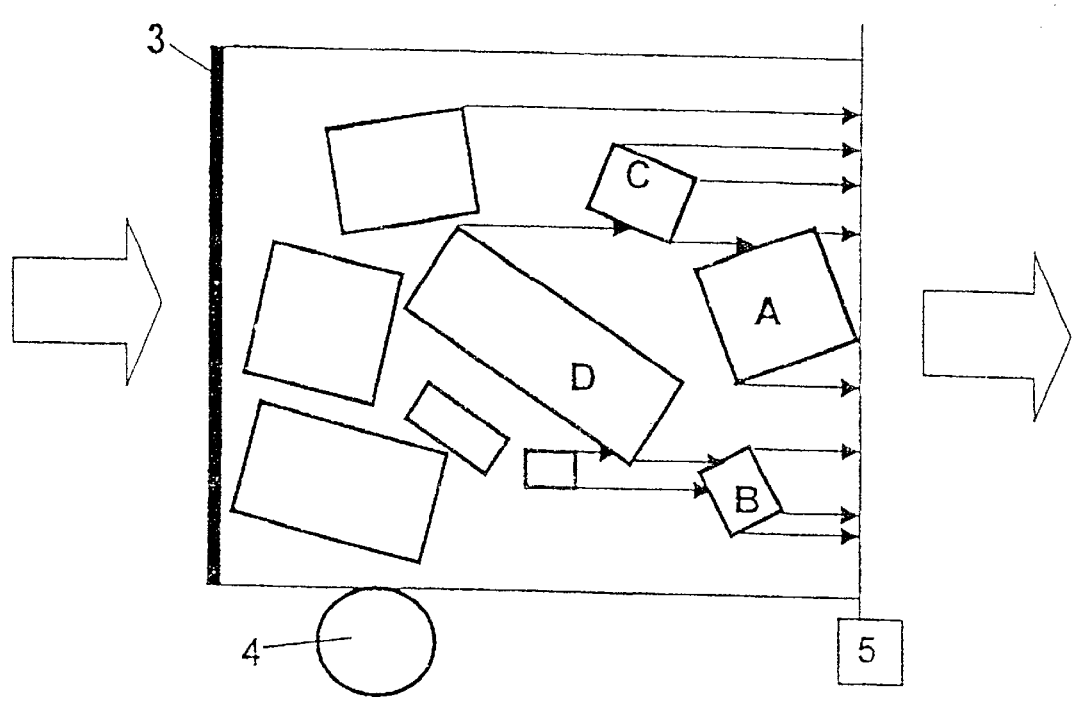

The invention is described in detail below by way of an exemplary embodiment, with reference to the drawings. Shown are in:

FIG. 1 a schematic block diagram of the separating arrangement, with a plan view of the lifting mechanisms and transport belts;

FIGS. 2a–c schematic side views of the separating arrangement with lifting magnets, in three separating phases;

FIGS. 3a–c schematic side views of the separating arrangement with pneumatic or hydraulic lifting cylinders, in three separating phases;

FIG. 4 a schematic side view of the separating arrangement, with a measuring element for measuring height;

FIG. 5 a schematic side view of the separating arrangement, with a color camera;

FIGS. 6a, b a schematic side view of the separating arrangement, with pressure-recording lifting mechanisms;

FIG. 7 a schematic plan view of a separating arrangement during the rotation of a package; and FIG. 8 a schematic plan view of a separating arrangement with packages for explaining the removal sequence.

The separating arrangement converts the unorganized flow of items into a sequential flow as the items are transported by a transport element. As the packages enter the separating arrangement, they are adjacent. They leave the separating arrangement consecutively at a defined interval.

As can be seen from FIG. 1, lifting mechanisms 2 are disposed one behind the other in the transport direction. Narrow transport belts 1 are located between rows of lifting mechanisms. The packages are transported from left to right. When the packages have reached the end of the separating arrangement, a light barrier 5 serving as a measuring element for detecting packages at the end of the transport belts emits a signal, and a control device 6 stops the drive of the transport belts 1.

For purposeful separation of the packages, it is necessary to ascertain their position and their base shape. To this end, in accordance with FIG. 1, an optical sensor line 3 that extends transversely to the transport direction is provided directly in front of the transport belts, beneath the transport plane of the transport belts 1. The packages moving past the optical sensor line 3 deactivate its photocells, which are permanently illuminated from above. The pattern formed by the activated and deactivated photocells is transmitted with the instantaneous position, as measured with an interval-setting element 4, to the control device 6. The interval-setting element 6 [sic] is connected to the drive of the transport belts 1.

After the drive of the transport belts 1 is stopped, the control device 6 uses the information from the sensor line 3 and the interval-setting element 4 to form an image of the coverage of the separating arrangement by packages. The other figures explain the function in more detail.

The schematic side views of FIGS. 2a–c illustrate the separating process with the use of lifting magnets 7. As can be seen in FIG. 2a, two packages 8, 9 are located on the transport belts 1, which transport them from left to right, as indicated by the arrows. In the extended state, the tappets of the lifting magnets 7 are located beneath the transport plane of the transport belts. The tappets are already extended because only a small current is required for retaining the tappets (even under a load) in comparison to the current required for raising the tappets under a load.

Once the front package 9 has reached the end of the transport belts 1, it is stopped. Then, all of the lifting magnets 7 are raised by way of an adjusting mechanism 10, not shown, or an adjusting mechanism 11, not shown, lowers the transport belts 1, so the packages are located on the tappets above the transport belts 1 (FIG. 2b). The transport belts 1 are now set in motion again. Afterward, the tappets beneath the front package 9 are lowered, as are the other tappets that are not carrying a package. The front package 9 is then located on the transport belts 1, and is transported away, as indicated by the arrow (FIG. 2c). The tappets that are not carrying packages 8, 9 are likewise lowered at the beginning, so the packages can exit the separating arrangement unimpeded. The packages—in this case, only the one package 8—are then transported away successively.

FIGS. 3a–c depict the separation process with the use of pneumatic or hydraulic lifting cylinders 12. Because the tappets can be raised under a load in this case, it is not necessary to adjust the height of the lifting cylinders 12 or the transport belts 1. In accordance with FIG. 3a, the tappets are located in the lower end position beneath the transport plane of the transport belts 1, and the transport belts 1 transport the packages 8, 9 to the right.

After the transport belts 1 have been stopped (the front package 9 has reached the end of the transport belts 1), the tappets under the packages 8, 9 are raised into the upper end position above the transport plane of the transport belts 1 (FIG. 3b). After the transport belts 1 have been set in motion again, first the tappets under the package 9 are lowered, then the tappets under the package 8 are lowered, so the packages 8, 9 are transported away consecutively (FIG. 3c). To avoid uncontrolled movements of the packages as the tappets of the lifting mechanisms are lowered, the lowering movements can also be damped. When packages come to rest directly against one another, the information from the optical sensor line 3 and the interval-setting device 4 does not suffice to recognize this occurrence. For this reason, a height-measuring device 13, in this instance an optical sensor line, is provided between the incoming transport element 14 (flush-mounted belt) and the transport belts 1, as shown in FIG. 4. This additional height information permits the recognition of touching packages.

Figure 6B:
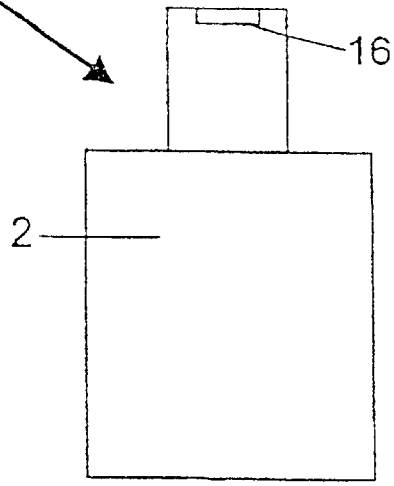

A further, or additional, option for distinguishing among packages is the color recording of the package surfaces by means of a color-image recording device 15 (FIG. 5). In a further variation shown in FIGS. 6a and 6b, the lifting mechanisms 2 can be equipped with pressure-recording elements 16 for ascertaining the base shape of the packages 8, 9. If larger packages are to be oriented in position, the tappet of a lifting mechanism 17 is lowered beneath the respective package later, so the transport belts 1 rotate the package about this tappet as a point of rotation (FIG. 7).

FIG. 8 illustrates the separating algorithm. In the plan view, the packages on the separating arrangement can be recognized by their base shapes. After the positions and base shapes of the packages have been ascertained with the aid of known recognition algorithms and the use of image-processing algorithms, based on the data recorded by the different measuring elements, and stored in the control device 6, the sequence in which the packages will be transported away is determined. The transport of the respective package cannot be impeded by another package. In this example, if numerous options are available, the package located closest to the exit is transported away first. According to these rules, package A is separated out first, then package B, package C, package D, etc.

What is claimed is:

1. An arrangement for separating adjacent packages, which are supplied in and out of the arrangement by transport elements, characterized by the following elements:

a plurality of rows of lifting mechanisms (2), which are disposed one behind the other in the transport direction, and between which narrow, endless transport belts (1) are located;

first elements (5) for detecting packages at the end of the transport belts (1);

second elements (3, 4) for ascertaining the position and base shape of the packages at the end of the incoming phase, in which the front package(s) has (have) reached the end of the transport belts (1);

a control device (6), which assures the following procedure in connection with the first and second elements:

the packages are supplied by the incoming transport element (14) and the transport belts (1) until the front package(s) (9) has (have) reached the end of the transport belts (1), with the transport plane of the transport belts (1) being located above the tappets of the lifting mechanisms (2);

the transport belts (1) are moved downward, or the lifting mechanisms (2) are moved and/or actuated such that at least the tappets are in their upper end position above the transport plane of the transport belts (1) on which packages (8, 9) are located;

the transport belts (1) and the transport element are set in motion for transporting the packages (8, 9) away;

the tappets of the lifting mechanisms are lowered into the lower end positions such that the transport belts (1) only transport one of the packages (8, 9) away, a process that cannot be impeded by the other packages; and a further receiving cycle starts when the last package is transported away, and the incoming packages are separated.

2. The arrangement according to claim 1, characterized in that the lifting mechanisms (2) comprise lifting magnets (7).

3. The arrangement according to claim 1, characterized in that, when the packages (8, 9) are conveyed in, the tappets of the lifting magnets (7) are located in the upper end position; after the incoming phase has ended, an adjusting mechanism raises all of the lifting magnets (7), or lowers the transport belts (1), such that the tappets are located above the transport plane of the transport belts (1); when the first package (9) is separated out, all of the tappets on which no packages are located are additionally lowered; and after the separation process, the adjusting mechanism lowers the lifting magnets (7) again, or the transport belts (1) are raised again and all of the tappets of the lifting magnets (7) are moved back into the upper end position.

4. The arrangement according to claim 1, characterized in that the lifting mechanisms comprise pneumatic or hydraulic lifting cylinders (12).

5. The arrangement according to claims 1, characterized in that, when the packages (8, 9) are conveyed in, the tappets of the lifting cylinders (12) are located in the lower end position; after the incoming phase has ended, the tappets of the lifting cylinders (12) above which packages (8, 9) are located are moved into the upper end position above the transport plane of the transport belts (1).

6. The arrangement according to one of claim 1, characterized in that the lifting mechanisms (2) include damping members for damping the downward movement.

7. The arrangement according to claim 1, characterized in that, in addition to the first and second elements that record the occupied surfaces, measuring elements (13) that record the height profile of the packages (8, 9) are provided for ascertaining the position and base shapes of the individual packages at the end of the incoming phase.

8. The arrangement according to claim 1, characterized in that second elements (3, 4) that record the occupied surfaces, and/or a color-image recording device (15), are or is provided for ascertaining the position and base shapes of the individual packages (8, 9) at the end of the incoming phase.

9. The arrangement according to claim 1, characterized in that an optical sensor line (3) and an interval-setting device (4) that are disposed beneath the transport plane, transversely to the transport direction, are provided in front of the transport belts (1) and the lifting mechanisms (2) for determining the traversed path of the transport belts (1), with the control device (6) using the signals of these devices to ascertain the position and base shapes of the packages when the transport belts (1) are stopped.

10. The arrangement according to claim 1, characterized in that the lifting mechanisms (2) are equipped with sensors (16), which detect the load of the tappets with a specific weight for ascertaining the occupied surfaces/base shapes at the end of the incoming phase.

11. The arrangement according to claim 1, characterized in that the control device (6) is embodied such that, to orient the packages in the separation process, the tappets of the lifting mechanisms (17) are lowered beneath a fixed point of rotation of the respective package later than the other tappets, on which the package lies.

* * * * *